(No Model.)
F. L. G. CHAPMAN.
SPINDLE BEARING FOR AXLES.
No. 553,334. Patented Jan. 21, 1896.
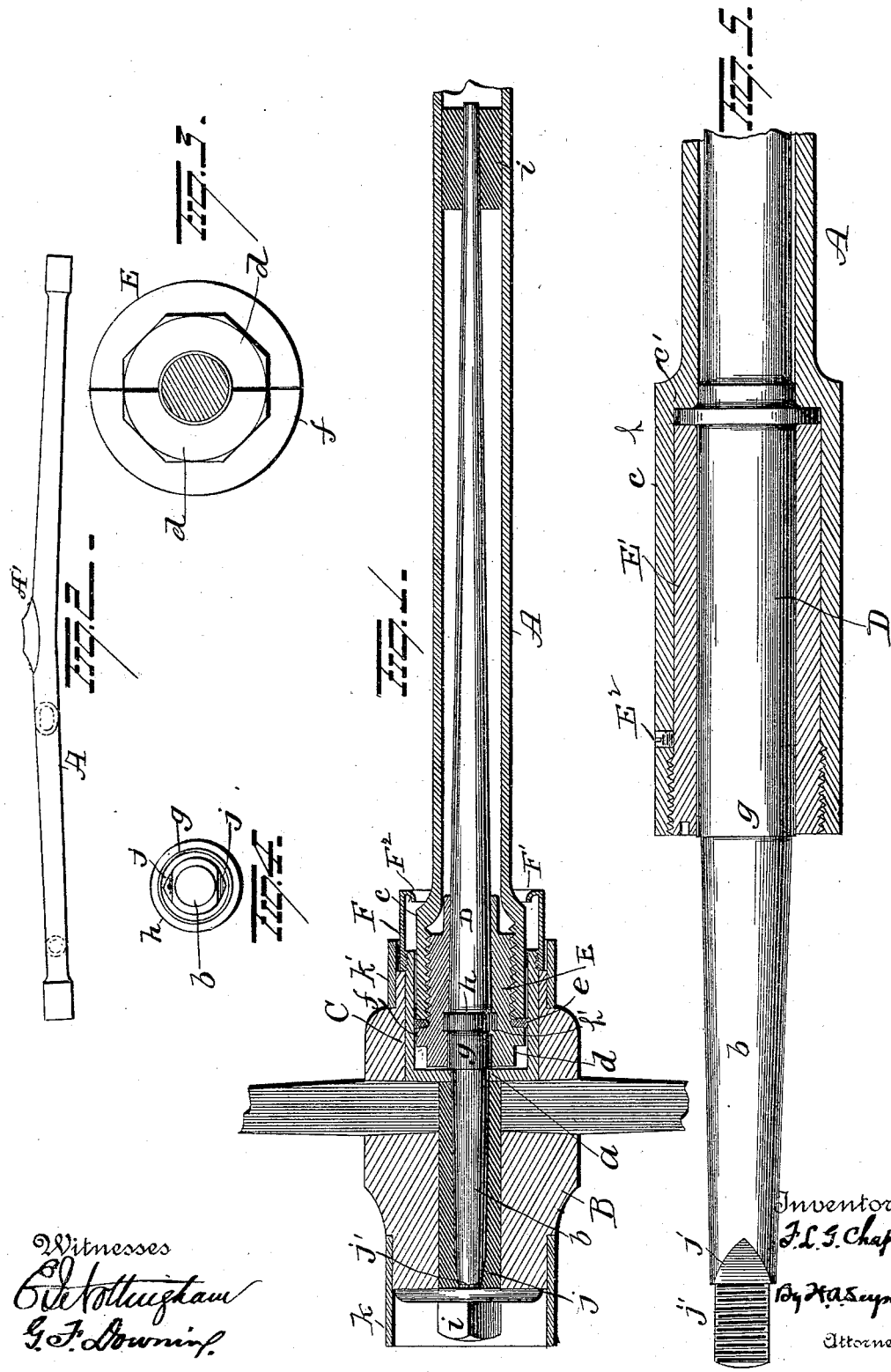

UNITED STATES PATENT OFFICE.

FRANK L. G. CHAPMAN, OF STEVENS POINT, WISCONSIN, ASSIGNOR OF ONE-HALF TO VERNON P. ATWELL, OF SAME PLACE.

SPINDLE-BEARING FOR AXLES.

SPECIFICATION forming part of Letters Patent No. 553,334, dated January 21, 1896.

Application filed December 28, 1893. Serial No. 494,988. (No model.)

*To all whom it may concern:*

Be it known that I, FRANK L. G. CHAPMAN, of Stevens Point, in the county of Portage and State of Wisconsin, have invented certain new and useful Improvements in Spindle-Bearings for Axles; and I do hereby declare the following to be a full, clear, and exact description of the invention, such as will enable others skilled in the art to which it appertains to make and use the same.

My invention relates to an improvement in spindle-bearings for axles, the object of the invention being to so construct the device that it shall be compact and assure the easy running of the spindle.

A further object is to so construct the bearing that it can be located in the hub of a wheel in such manner as to reduce the amount of leverage on the spindle to a minimum.

A further object is to produce a spindle-bearing for an axle which shall be light, strong, simple, and effectual in the performance of its functions.

A further object is to provide simple and efficient means for preventing the escape of oil from the hub in which the spindle is located.

With these objects in view the invention consists in certain novel features of construction and combinations and arrangements of parts, as hereinafter set forth, and pointed out in the claims.

In the accompanying drawings, Figure 1 is a sectional view illustrating my improvements. Figs. 2, 3, and 4 are detail views. Fig. 5 is a view of a modification.

The bearings for the hubs at both ends of the axle being identical in construction, a description of one will suffice for both.

A represents the axle and B a hub. The shell of the axle is made thick at the center of the axle where the major portion of the weight comes, and then tapers toward the ends. It is then pressed to the same width from end to end, except at the enlarged extremities. Thus it will be seen that the body of the axle will be elliptical in cross-section, and at its center it will be provided with a seat A' for the accommodation of carriage-springs. An axle thus constructed is self-supporting, strong and durable. The inner end of the hub is recessed for the accommodation of a thimble C, the bottom or outer end of which terminates in line with the spoke-sockets in the hub and is made with a perforation $a$ for the passage of the forward tapering end $b$ of a spindle D.

The outer end of the tubular axle A is made with an internally-screw-threaded enlargement $c$ for the accommodation of an externally-screw-threaded journal-box E, which constitutes the forward bearing of the spindle, and when the parts are in their normal positions said enlargement $c$, containing the box E, is located within the thimble C, thus disposing the forward bearing of the spindle well in the hub and reducing the leverage on said spindle to a minimum. The box E is preferably made in two sections, each section being provided at its outer end with an angular projection $d$, and when the parts of the box are placed together said projections constitute a nut for the reception of a suitable wrench, whereby to screw the box E into or out of the enlargement $c$ of the axle.

An annular washer $e$ encircles the box E in proximity to its outer end, said washer being disposed, when the parts are in their normal positions, between the forward end of the enlargement $c$ of the axle and a flange $f$ on the box E. Within the box E the spindle D is made with a shoulder $g$, which terminates at or near the outer end of the box. The spindle D is also made (within the box E) with a fixed collar $h$, and the box is made with a recess $h'$ for the accommodation of said collar. From the fixed collar $h$ the spindle D is made tapering and of a length sufficient to extend some distance within the tubular axle A. The inner or small end of the spindle has its bearing in a box $i$ located in the axle A, said box being preferably made of Babbitt metal forced into the axle.

Instead of employing a sectional box E, as above described, a straight journal-box E' may be used, as shown in Fig. 5. With this construction the fixed collar $h$ on the spindle E is located at the inner end of the enlargement $c$ of the axle and bears on the shoulder $c'$ and the end of the box E'. The box E' can be readily adjusted to compensate for wear of the fixed collar, and will be retained in its normal position by means of a set-screw $E^2$.

The end of the thimble C is screw-threaded for the reception of a collar or sleeve F, having an inwardly-projecting flange F' at its free end, or said collar may be brazed to the thimble or the thimble may be extended and the annular flange located at the free end thereof. By locating the flange F' at the free end of the thimble a chamber $F^2$ is produced within the thimble, which serves to receive oil escaping from the forward bearing of the spindle and prevents the escape of said oil from the hub, thus preventing the hub becoming disfigured by escaping oil. The flange F' also serves to hide the forward bearing of the spindle, thus improving the appearance of the device.

When the forward end of the spindle is passed through the hub, Babbitt metal is run into the forward end of the hub around the forward end of the spindle, and a nut $i'$ is screwed on the projecting end of the latter. When the nut is screwed to its seat the spindle will be drawn sufficiently forward to cause the shoulder $g$ thereon to bear against the bottom or outer end of the thimble C. In order to prevent the spindle from turning when the nut $i'$ is screwed thereon the spindle is made with flattened faces $j$ just in rear of the screw-threaded portion $j'$ thereof. It will be seen that when the Babbitt metal is inserted into the hub, as above explained, it will fill the space in the opening in the hub between the wall of said opening and the spindle and bear against the flat faces $j$, thus effectually preventing the spindle from turning when the nut $i'$ is screwed thereon. The hub will preferably be provided with hub and point bands $k$ $k'$.

Heretofore it has been the custom to make the forward bearing of the spindle rigid, and this has been found to be objectionable owing to the fact that it cannot be adjusted when the bearing becomes irregularly worn, as it is liable to do with constructions of the kind to which this invention relates.

It will be seen that by constructing the forward bearing or journal-box of the spindle in the manner above explained said bearing or journal-box E will be adjustable so that when it becomes irregularly worn it can be readily turned so as to present a new wearing-surface.

My improvements are very simple in construction, cheap to manufacture and effectual in the performance of their functions.

Having fully described my invention, what I claim as new, and desire to secure by Letters Patent, is—

1. The combination with an axle, of a hub or thimble, a removable collar or sleeve provided at its inner end with an annular flange which projects inwardly toward the axle and toward the outer end of the hub whereby an oil chamber is formed, the internal diameter of the flange being slightly greater than that of the axle whereby to permit the flange to slip over the axle, substantially as set forth.

2. The combination with an axle having a stationary bearing therein, of a spindle having a tapering inner end which enters the stationary bearing and a collar formed thereon at or near its outer end, and a box constructed to screw into the end of the axle and bear against the outer end of the collar whereby to constitute a movable and adjustable bearing for the spindle to present a new bearing surface and force a larger portion of the tapering end into the stationary bearing to compensate for wear, substantially as set forth.

3. The combination with an axle, and spindle revolubly supported therein, of a hub having a thimble therein adapted to receive an end of the axle therein and spokes the tenons of which bear against the inner end of the thimble, substantially as set forth.

4. The combination with an axle and a spindle revolubly supported therein, of a hub having the usual spokes, and a thimble therein, the inner end of which abuts against the tenons of the spokes, said thimble adapted to receive the end of the axle therein, substantially as set forth.

5. The combination with an axle having internal screw threads at its outer end, and a spindle removably supported in the axle, of a threaded box adapted to screw into the threaded end of the axle, said box having an annular flange located at or near its outer end between which and the end of the axle a washer is adapted to be held, and a hub having a thimble therein which fits over and tightly upon said washer whereby the latter prevents the passage of oil at this point, substantially as set forth.

In testimony whereof I have signed this specification in the presence of two subscribing witnesses.

FRANK L. G. CHAPMAN.

Witnesses:
D. E. FROST,
W. W. GOFF.